United States Patent [19]

Trudeau

[11] 4,320,679
[45] Mar. 23, 1982

[54] CHAIN SAW SUPPORT

[76] Inventor: Roger Trudeau, R.F.D. #1, Spencer, Mass. 01562

[21] Appl. No.: 150,927

[22] Filed: May 19, 1980

[51] Int. Cl.³ ............................................. B27B 17/02
[52] U.S. Cl. .................................... 83/574; 83/425.2; 83/435.1; 83/437
[58] Field of Search ..................... 83/574, 425.2, 435.1, 83/437

[56] References Cited

U.S. PATENT DOCUMENTS

| | | |
|---|---|---|
| 2,779,359 | 1/1957 | Koski . |
| 2,851,067 | 9/1958 | Greenslate ........................ 83/574 X |
| 2,893,447 | 7/1959 | Showers ............................... 83/574 |
| 3,026,918 | 3/1962 | Dooley . |
| 3,051,203 | 8/1962 | Hayden . |
| 3,134,409 | 5/1964 | Hayden . |
| 3,213,906 | 10/1965 | McManama . |
| 3,225,799 | 12/1965 | Hayden et al. . |
| 3,864,830 | 2/1975 | Haddon ................................ 83/745 |
| 4,122,604 | 10/1978 | Brown ................................. 83/745 |
| 4,123,957 | 11/1978 | Niemela et al. ................... 83/574 X |
| 4,210,049 | 7/1980 | Gauthier ........................... 83/574 X |
| 4,214,498 | 7/1980 | Zukas et al. ......................... 83/796 |
| 4,245,535 | 1/1981 | Lockwood et al. ................ 83/798 |

Primary Examiner—Donald R. Schran
Attorney, Agent, or Firm—Blodgett & Blodgett

[57] ABSTRACT

Support for holding a chain saw in a vertical aspect, the support having a slidable table to move a log across the blade.

6 Claims, 4 Drawing Figures

CHAIN SAW SUPPORT

BACKGROUND OF THE INVENTION

The increased use of wood stoves for heating has led to a similar increase in interest in the householder cutting his own wood. In many cases, the wood is delivered in cord lengths, that is to say, four feet long and it is necessary accurately to cut the four foot length of log into smaller pieces which fit the wood stove. While the gas-powered chain saw is an excellent tool for cutting wood, it is difficult to support the wood and to saw it accurately single-handed. This is because the chain saw usually requires the use of two hands, one hand holding the weight of the saw and the other one actuating the accelerating trigger. These and other difficulties experienced with the prior art devices have been obviated in a novel manner by the present invention.

It is, therefore an outstanding object of the invention to provide a chain saw support which not only holds the chain saw, but also accelerates it as the user moves a log across the blade.

Another object of this invention is the provision of a chain saw support which is simple and rugged in construction, which is inexpensive to manufacture, and which is capable of a long life of useful service.

A further object of the present invention is the provision of a chain saw support in which the bar of the chain is automatically oiled during use.

It is another object of the instant invention to provide a support for a chain saw, the support being provided with a table for moving a log across the saw and being provided with means to lock the table except when it is deliberately released.

A still further object of the invention is the provision of a chain saw support which is relatively safe to use.

With these and other objects in view, as will be apparent to those skilled in the art, the invention resides in the combination of parts set forth in the specification and covered by the claims appended hereto.

SUMMARY OF THE INVENTION

In general, the invention consists of a chain saw support having a main frame with spaced parallel tracks and having a mount for fastening a chain saw on the frame with its blade extending vertically upwardly in a plane that lies parallel to and externally of the tracks. A table is slidably mounted on the tracks for carrying a log from a first position away from the saw to a second position past the saw. An actuator operated by the sliding movement of the table is provided to accelerate the saw as the table carries the log from the said first position to the second position.

More specifically, the actuator includes a downwardly-extending rod having an inclined surface and having a cam follower with a peg that engages the saw trigger. A spring moves the finger to accelerate the saw as the table returns from the first position to the second position. A saw guard is mounted on the table and covers the saw blade when the table is in the first position, but exposes it as it moves from the first position to the second position.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
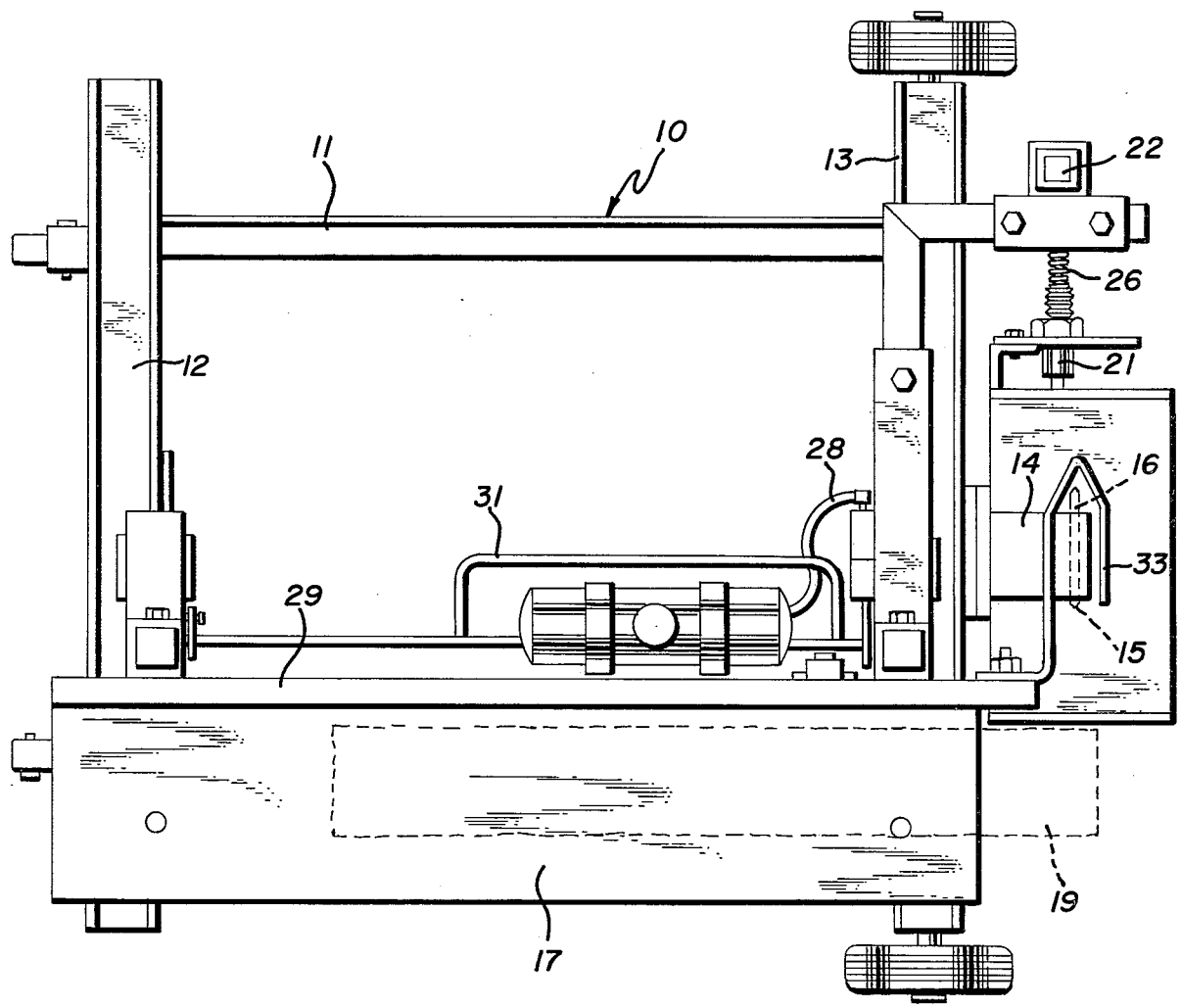
FIG. 1 is a plan view of a chain saw support embodying the principles of the present invention.

Referring first to FIG. 1, wherein is best shown the general features of the invention, it can be seen that the chain saw support, indicated generally by the reference numeral 10, is provided with a main frame 11 having four legs. Two of the legs are provided with wheels for moving the support from one place to another. The main frame is provided with two spaced, parallel, horizontal tracks 12 and 13. A mount 14 is provided for fastening a chain saw 15 to the frame with its blade 16 extending vertically upwardly in a vertical plane that lies parallel to and externally of the tracks 12 and 13. A table 17 is slidably mounted by means of wheels 18 on the tracks 12 and 13. It is thus capable of carrying a log 19 from a first position (as shown in FIG. 1) away from the saw 15 to a second position past the saw. An actuator 21 is operated by the sliding movement of the table 17 to accelerate the saw 15 as the table carries the log 19 from the said first position to the said second position.

Figure 2:
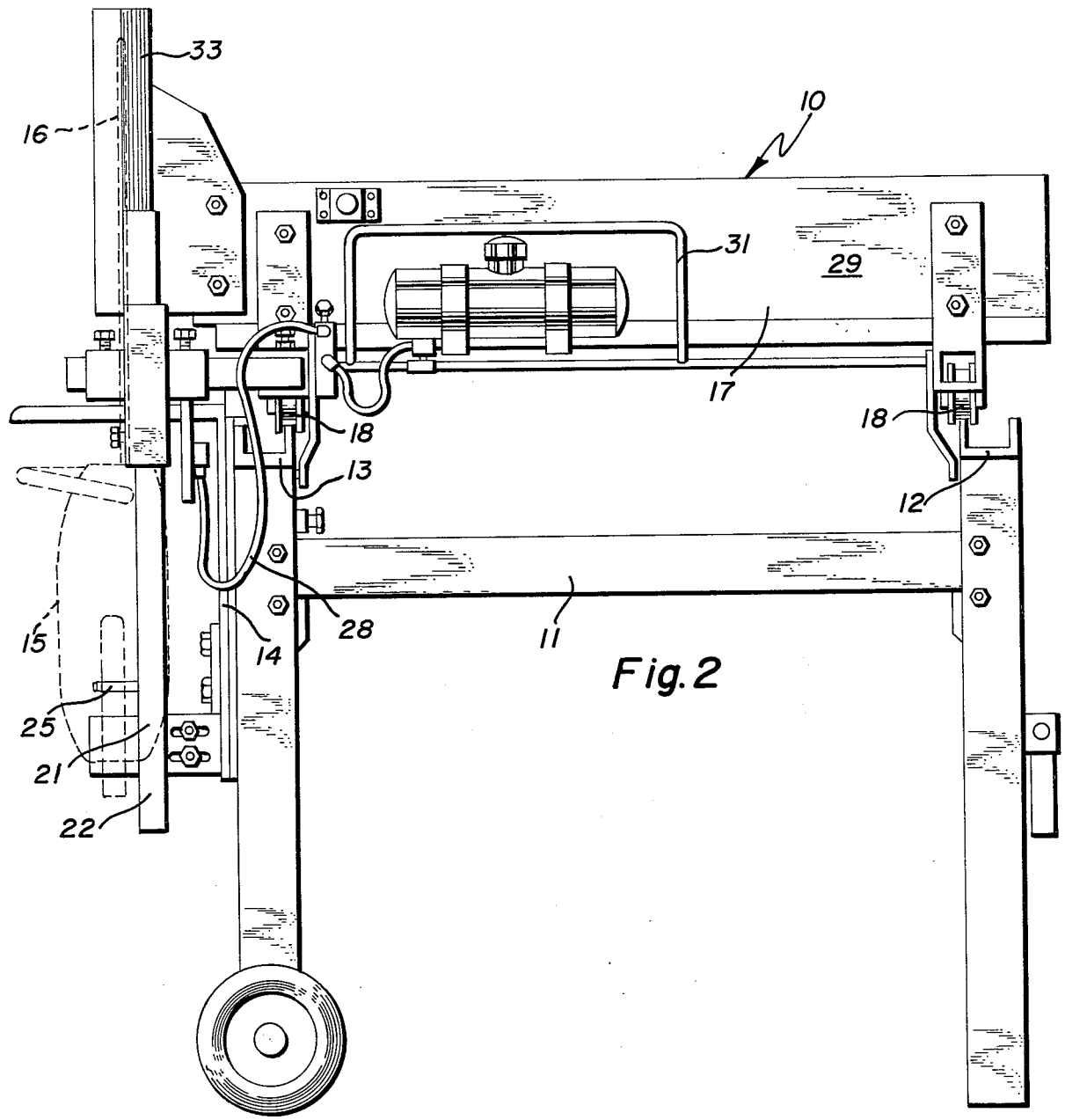
FIG. 2 is a vertical elevational view taken from the rear of the apparatus.
Figure 3:
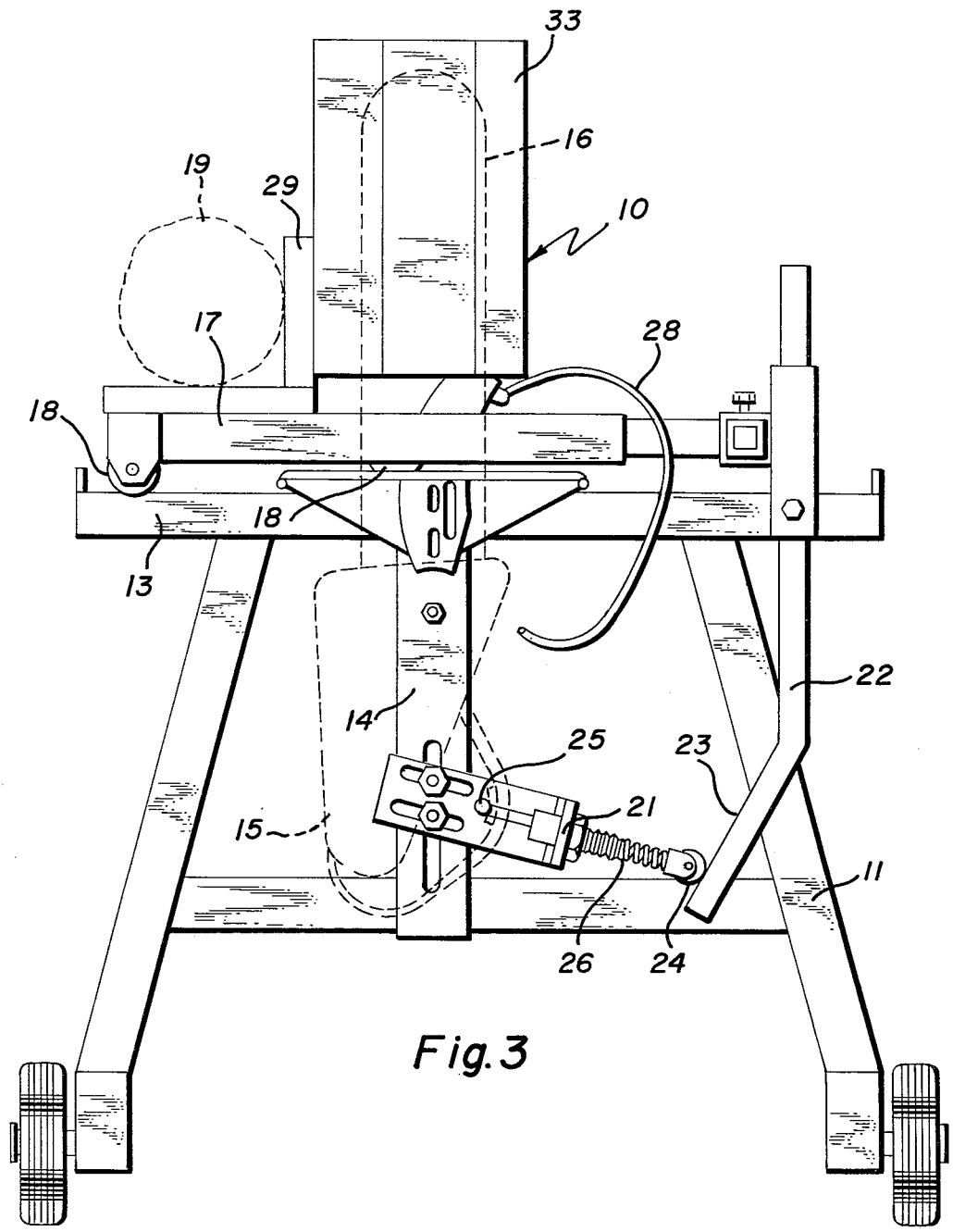
FIG. 3 is an end elevational view of the invention.
Figure 4:
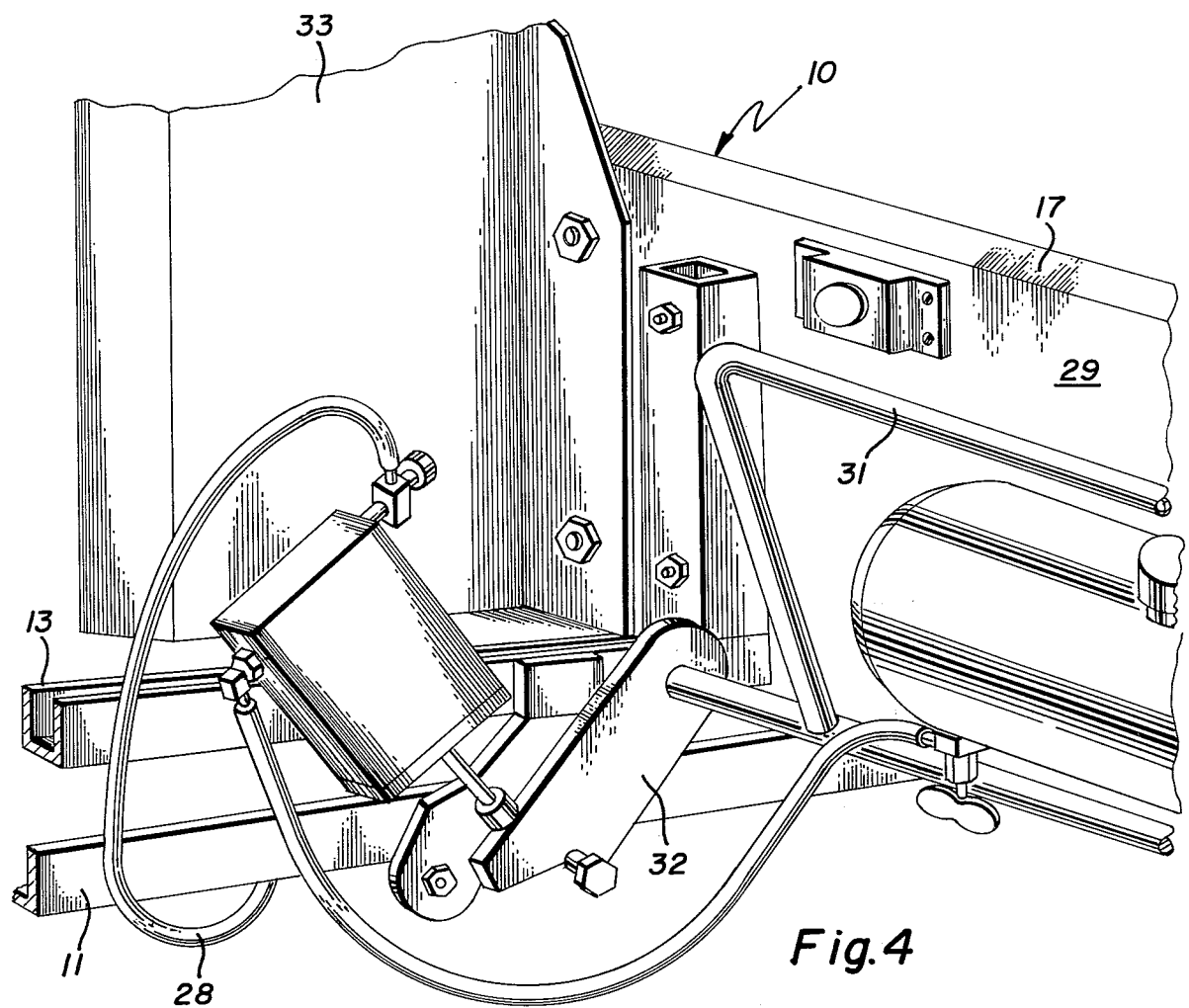
FIG. 4 is a perspective view of the details of a mechanism forming part of the invention.

Referring next to FIGS. 1, 2, and 3, it can be seen that the actuator 21 includes a downwardly-extending rod 22 having an inclined surface 23 (see FIG. 3). It also includes a cam follower 24 having a peg 25 that engages the saw trigger and having a spring 26 that retracts the finger to accelerate the saw as the table moves from the first position to the second position.

A bar oiler 28 is mounted on the frame 11 and is automatically actuated by movement of the table 17. The table is provided with a vertical fence 29 and the oiler is provided with a handle 31 located rearwardly thereof. A table lock mechanism 32 is also operated by the oiler handle 31. A saw guard 33 is mounted on the table and covers the saw blade 16 when the table 17 is in the first position, while it exposes the saw blade as the table moves from the first position to the second position.

The operation and the advantage of the invention will now be readily understood in view of the above description. The chain saw 15 is bolted to the mount 14 with its blade 16 extending vertically and enclosed within the guard 33. The saw is started up so that the motor drives the chain at slow speed or idle. The operator places a log 19 on the table 17 in the corner formed between the horizontal surface of the table and the vertical fence 29. The end of the log extends outwardly by the amount of the desired cut. The operator then advances the table across the saw on the ways or tracks 12 and 13, thus carrying the log into the blades 16 for the cutting operation. As he moves the table rearwardly, the guard 33 is moved away from the blade and exposes it to the log for the cutting operation. At the same time that the operator grasps the table by means of the top edge of the fence to move it rearwardly, he also grasps the handle 21 of the oiler and this automatically provides a supply of oil to the saw. By operating the handle 31, he also releases the table lock mechanism 32, so that the table can move rearwardly. As the table moves from the non-cutting position to the cutting position, the inclined surface 23 of the rod 22 is moved rearwardly so that the cam follower 24 is allowed to move to the right (in FIG. 3). This causes the peg 25 to engage and to move the saw trigger and accelerate the saw, so that, when the log reaches it, it is cutting at its best speed. Various adjustments are available in the rod position to cause this acceleration to take place at a desired rate. The return of the table to the original position causes the spring 26 to be compressed and to carry the cam follower to the left, so that the peg 25 moves away from the saw trigger and allows it to return to its idle speed. The return of the table to the original position also causes the table lock mechanism to fall into place once more and prevent the table from being moved again without deliberate actuation of the handle 31. The guard 33, of course, remains in place covering the saw blade at that time.

It can be seen, then, that the present invention involves a safe means of holding a chain saw, while it is being used to cut wood into smaller lengths. Means is provided for reducing its speed to "idle", when it is not actually sawing, and to prevent exposure of the blade, except when the user deliberately operates the table. The fact that it is necessary to squeeze the handle 31 and release the table lock mechanism 32 means that the oil valve and pump automatically operates the oiler 28 during every cycle which assures that the saw blade does not become too dry.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Chain saw support, comprising:

(a) a main frame having spaced, parallel tracks,
   (b) a mount for fastening a chain saw on the frame with its blade extending vertically in a vertical plane that lies parallel to and externally of the tracks,
   (c) a table for supporting a log so that the longitudinal axis of the log is transverse to said vertical plane, said table being slidably mounted on the tracks for carrying a log from a first portion away from the saw to a second position past the saw for making a transverse cut through the log, and
   (d) an actuator operated by the sliding movement of the table to accelerate the saw as the table carries the log from the said first position to the second position.

2. Chain saw support as recited in claim 1 wherein the actuator includes a downwardly-extending rod having an inclined surface, and a cam follower having a peg that engages the saw trigger and a spring that retracts the finger to accelerate the saw as the table moves from the first position to the second position, the inclined surface operating on the cam follower to retract the peg and decelerate the saw as the table returns from the second position to the first position.

3. Chain saw apparatus as recited in claim 1, wherein a bar oiler is mounted on the frame and automatically actuated by movement of the table.

4. Chain saw apparatus as recited in claim 3, wherein the table is provided with a vertical fence, and wherein the oiler is provided with a handle located rearwardly of the table.

5. Chain saw apparatus as recited in claim 4, wherein a table lock mechanism is also operated by the oiler handle.

6. Chain saw apparatus as recited in claim 1, wherein a saw guard is mounted on the table and covers the saw blade when the table is in the first position and exposes it as it moves from first position to second position.

* * * * *